United States Patent
Galbiati et al.

(10) Patent No.: US 6,804,131 B2
(45) Date of Patent: Oct. 12, 2004

(54) PWM/LINEAR DRIVER FOR AN ELECTROMAGNETIC LOAD

(75) Inventors: Ezio Galbiati, Agnadello (IT); Michele Boscolo, Sottomarina (IT)

(73) Assignee: STMicroelectronics S.R.L., Agrate Brianza (IT)

( * ) Notice: Subject to any disclaimer, the term of this patent is extended or adjusted under 35 U.S.C. 154(b) by 40 days.

(21) Appl. No.: 10/367,665

(22) Filed: Feb. 14, 2003

(65) Prior Publication Data

US 2003/0155896 A1 Aug. 21, 2003

(30) Foreign Application Priority Data

Feb. 19, 2002 (EP) .............................................. 02425081

(51) Int. Cl.[7] ........................................ H02M 3/5387
(52) U.S. Cl. .................................................... 363/132
(58) Field of Search .......................... 363/17, 98, 132; 318/439, 590, 591, 599, 611

(56) References Cited

U.S. PATENT DOCUMENTS

| | | | |
|---|---|---|---|
| 5,442,540 A | * | 8/1995 | Hua et al. ...................... 363/98 |
| 5,631,817 A | | 5/1997 | Minami |
| 5,838,515 A | | 11/1998 | Mortazavi et al. |
| 5,917,720 A | | 6/1999 | Galbiati |
| 6,023,143 A | * | 2/2000 | Salina et al. ................. 318/599 |
| 6,061,258 A | | 5/2000 | Galbiati et al. |
| 6,385,067 B2 | * | 5/2002 | Galbiati et al. ............. 363/132 |

FOREIGN PATENT DOCUMENTS

EP          0 962 915 A1     8/1999

\* cited by examiner

Primary Examiner—Matthew V. Nguyen
(74) Attorney, Agent, or Firm—Carol W. Burton, Esq.; William J. Kubida, Esq.; Hogan & Hartson L.L.P.

(57) ABSTRACT

The present invention relates a Pulse Width Modulation (PWM)/linear driver for an electromagnetic load by a bridge circuit of the type having a signal input and a signal output and at least two conduction control inputs for driving a voice coil motor in a linear mode and in a pulse width modulation. The bridge circuit is driven by a PWM converter coupled to one of said two control inputs and by a linear amplifier coupled to the other of said two control inputs.

12 Claims, 5 Drawing Sheets

PWM/LINEAR DRIVER FOR AN ELECTROMAGNETIC LOAD

FIELD OF THE INVENTION

The present invention relates to a Pulse Width Modulation (PWM)/linear driver for an electromagnetic load, particularly a PWM/linear driver for a hard disk of the type Voice Coil Motor (VCM).

BACKGROUND OF THE INVENTION

Contemporary hard disk drivers typically include a brushless DC motor within which a disk rotating spindle assembly for rotating at least one data storage disk at a desirable velocity, typically in a range between 5,000 and 10,000 revolutions per minute, is provided.

Hard disk drivers also typically include a rotary actuator structure powered by a Voice Coil Motor (VCM). The rotary actuator structure positions one or more slider head assemblies at desired locations relative to surfaces of the disk or disks.

A storage disk device such as a magnetic disk device etc. has been widely utilised as a storage device of a computer etc.

A high-density record and a decrease in the electric power consumed are demanded for this type of storage disk device. For reducing the electric power consumed by this magnetic disk device, a PWM driving system is applied to a driving stage of the VCM.

In U.S. Pat. No. 5,917,720 a method and a circuit for driving a bridge by a PWM procedure is described, wherein the current load is controlled by modifying the duty cycle of the two outputs of the PWM power stage.

In fact referring to the FIG. 1, the condition of no current is obtained by driving the two outputs OUTP and OUTM by means of two signals having the same frequency and the same duty cycle, that is equal to 50%.

By incrementing the duty cycle of the output OUTP and by decreasing the duty cycle of the output OUTM, or vice versa, the current will flow in the load with a direction and an intensity that depends on the difference of the duty cycles of the two outputs.

The current sensing is performed by a sensing resistance Rs placed in series to the load; the voltage generated at the ends of said sensing resistance is opportunely amplified by an operational amplifier, called Sense Amplifier, and said voltage is used as a feedback to close the current control loop of the circuit.

However, this circuit due to the switching frequency of the power stage PWM, of about 100 KHz, and due to the low common mode rejection of the Sense Amplifier at said frequencies, has the output signal of the Sense Amplifier disturbed by the fast common mode variation to which the inputs are subjected.

In U.S. Pat. No. 6,061,258 another embodiment for monitoring the current in an inductive load driven by a PWM power stage is described.

Also in this embodiment there are problems with the common mode rejection, even if the current sensing is made synchronous with the switching frequency of the PWM power stage.

In the heretofore cited patents, the basic concept was to drive the power stage by a PWM power amplifier.

To prevent these drawbacks, some systems able to drive the output stage both in linear and PWM modalities have been implemented.

In fact, in EP Patent No. 962915, a schematic PWM/linear driver circuit for a VCM according to the prior art is described.

As illustrated in FIG. 2, a magnetic disk apparatus includes a magnetic disk 1 and a magnetic head 2. Usually the magnetic disk 1 has a data surface on which servo signals are embedded in data tracks. The magnetic head 2 reads and writes information from and to the magnetic disk 1. An Integrated Circuit (IC) head 3 amplifies the signal read by the magnetic head 2. An IC read channel 4 selects the read signal from the head IC 3. A servo signal demodulator 5 demodulates the servo signal from the read channel IC 4 into a position signal.

A servo gate generation circuit (not shown in FIG. 2) generates a servo gate signal, synchronizing with rotations of the magnetic disk 1.

A control circuit 7 consists of a processor. The control circuit 7 reads a position signal in accordance with the servo gate signal. Then, the control circuit 7 detects a present position of the head 2 from the position signal, and generates a current indication value corresponding to a distance to a target position from the present position.

A Digital to Analog Converter (DAC) 8 converts the current indication value given from the control circuit 7 into an analog quantity.

A PWM driver 9 becomes operable when a PWM enable signal from the control circuit 7 is at a high level, and outputs driving current for PWM-driving a coil edge voltage in accordance with the current indication value given from the DAC converter 8.

A linear driver 10 operates and outputs a driving current of which a magnitude corresponds to the current indication value given from the DAC converter 8.

An AND gate 11 takes the logic function AND of the servo gate signal and the PWM enable signal, and generates a switchover signal SW.

A coil driving circuit 12 includes four power transistors Q1–Q4. A coil VCM of the actuator is connected to middle point of the four power transistors Q1–Q4. A current detection resistor RS detects an electric current flowing to the coil VCM.

A differential amplifier 13 generates an inter-terminal voltage of the current detection resistor RS, and feeds back this voltage to the PWM driver 9 and the linear driver 10 as well. An analog switch 14 selects the output of the PWM driver 9 or of the linear driver 10 in function of the switchover signal SW.

Further schematic PWM/linear driver circuits for a VCM according to the prior art, in by way of example, are described in U.S. Pat. Nos. 5,631,817 and 5,838,515.

All these patents have a basic concept, that is, during the seek control, also called coarse control, the VCM is PWM—driven and during the track operation, also called fine control, the VCM is linearly driven.

Such a technique of the output stage driving has the drawback of integrating the two pre-driver of said output stage, that is the linear and PWM drivers, with a consequent increment of the necessary silicon area. Moreover the transition between the linear modality and the PWM modality, and vice versa, is not executed instantaneously, but the circuit is perturbed by such a transition.

SUMMARY OF THE INVENTION

In view of the state of the art described, it is an object of the present invention making a circuit able to select which type of operative modality has to be chosen without any further circuits.

According to the present invention, such object is achieved by a bridge circuit of the type having a signal input and a signal output and at least two conduction control inputs for driving a voice coil motor in a linear mode and in a pulse width modulation (PWM), the bridge circuit characterized in that it is driven by a PWM converter coupled to one of said two control inputs and by a linear amplifier coupled to the other of said two control inputs.

Such object is also achieved by a method for driving a bridge circuit of the type having a signal input and a signal output and at least two conduction control inputs for driving a voice coil motor in a linear mode and in a pulse width modulation, characterized by comprising the step of driving simultaneously in a PWM procedure one of said two control inputs and in a linear procedure the other of said two control inputs.

Thanks to the present invention it is possible making a PWM/linear driver for an electromagnetic load without discontinuity in the control loop.

Moreover, thanks to the present invention it is possible making a PWM/linear driver for an electromagnetic load easier in its implementation with respect to the prior art embodiments.

Furthermore, thanks to the present invention it is possible making a PWM/linear driver that, due to the linear driver, does not hamper with the read and write signals of the HDD and, thanks to the PWM driver, consumes less power with respect to the known drivers.

BRIEF DESCRIPTION OF THE DRAWINGS

The features and the advantages of the present invention will be made evident by the following detailed description of an embodiment thereof which is illustrated as not limiting example in the annexed drawings, wherein.

DETAIL DESCRIPTION

Figure 1:
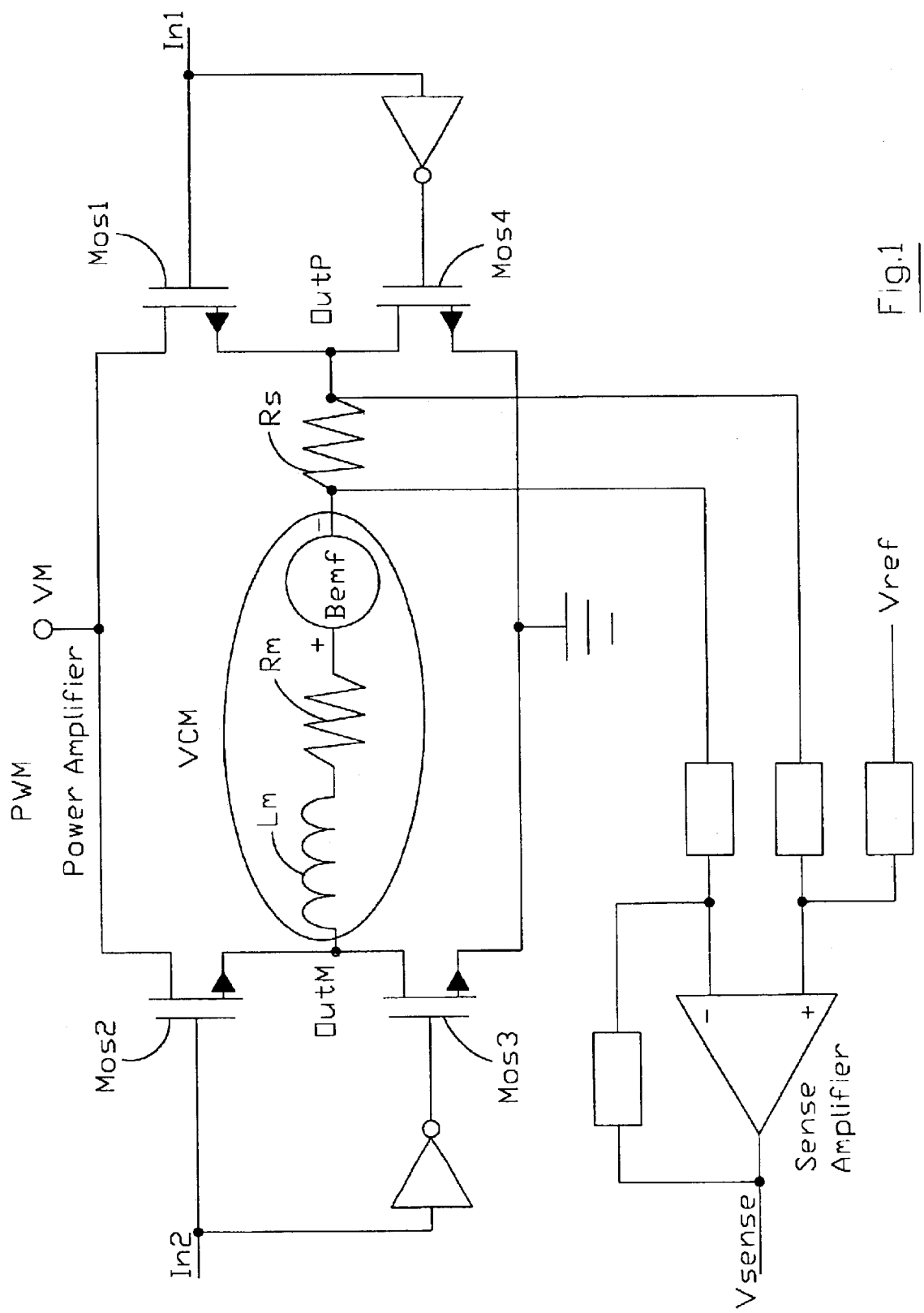
FIG. 1 shows a PWM driver for an output stage, according to the prior art.
Figure 2:
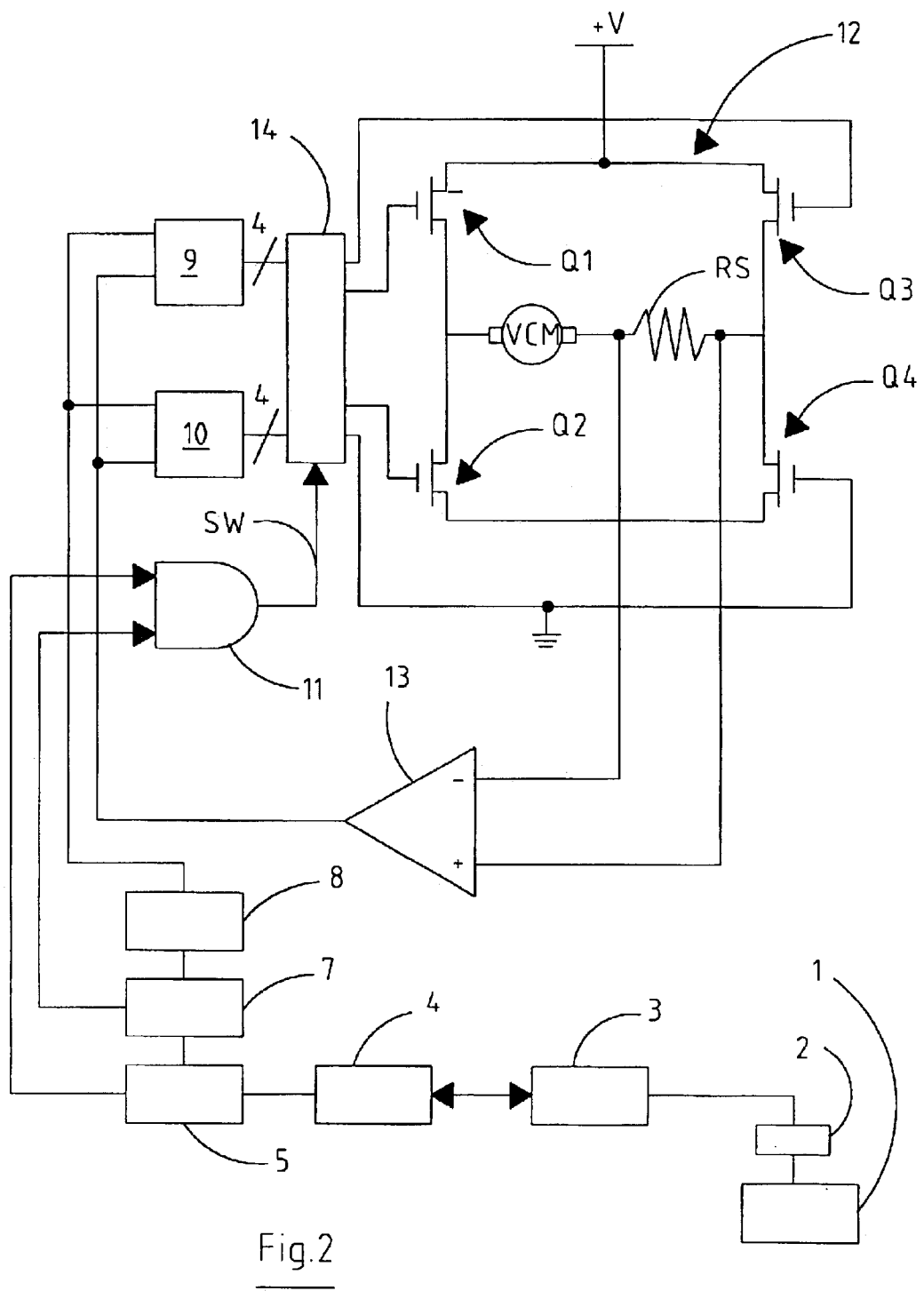
FIG. 2 shows a PWM/linear driver for an output stage, according to the prior art.
Figure 3:
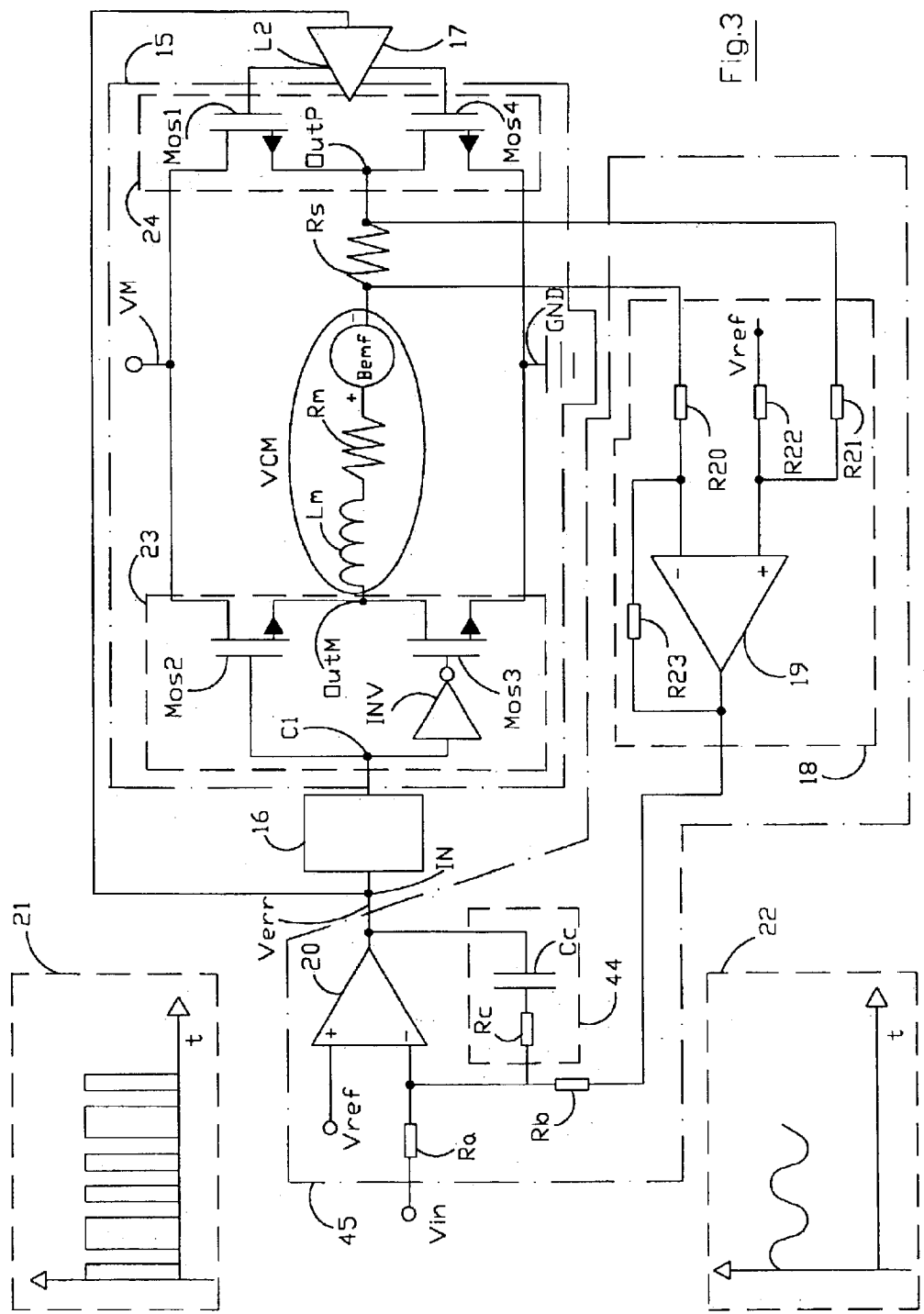
FIG. 3 shows in the circuit block diagram of the PWM/linear driver according to the present invention.

In FIG. 3 a circuit block diagram of the PWM/linear driver according to the present invention is shown. FIG. 3 shows a diagram of a bridge circuit 15 connected at a side to PWM converter 16 and at the other side to a linear amplifier 17. The PWM converter 16 and the linear amplifier 17 are controlled by a control signal Verr, as hereinafter described.

Said bridge circuit 15 has two terminals Vm and GND for a signal input, two terminals OutM and OutP for a signal output and two terminals C1 and C2 for control inputs. The bridge circuit 15 comprises, by way of example, four n-channel MOS transistors Mos1, Mos2, Mos3 and Mos4 whose main conduction paths, i.e. drain-source, constitute the branches of the bridge circuit 15. The control terminal of the transistor Mos2 is connected directly to the terminal C1, the control terminal of the transistor Mos3 is connected to the terminal C1 through an inverter INV, the control terminal of the transistor Mos1 is connected directly to the terminal C2, the control terminal of the transistor Mos4 is connected to the terminal C2.

It is to be noted that the n type Mosfet transistors Mos1, . . . , Mos4 can be replaced by bipolar transistors.

Moreover it is possible to note that between the terminals OutM and OutP is placed a load VCM represented by the series of an inductor Lm, a resistance Rm and BEMF voltage.

Normally to the terminal Vm is coupled a power potential reference and to the terminal GND is coupled a ground potential reference.

In series with the load VCM is located, by way of example, a resistor Rs, which acts as a detection circuit, in module and direction, of the current supplied at the outputs OutM and OutP.

There are other alternative ways of detecting, in module and direction, the current in the load of the bridge circuit 15. The resistor Rs in series was chosen for its simplicity.

The voltage Vs which develops across the resistor Rs is sent to a network 45 which comprises a differential amplifier 18, also called sense amplifier, consisting of an operational amplifier 19 having an inverting input connected to one of the terminals of the resistor Rs through a resistor R20, a non-inverting input connected to the other terminal of the resistor Rs through a resistor R21 and a feedback output on the inverting input through a resistor R23 and in addition the non-inverting terminal is connected to a potential reference Vref through a resistor R22.

This potential is, for example, one half the potential of the power reference Vm.

The output of the sense amplifier 18 is connected through a resistor Rb to the inverting input of an operational amplifier, also called error amplifier, 20. This error amplifier 20 exhibits a non-inverting input connected to the reference Vref and is feedback by means of a feedback network 44 connected between its output and its inverting input. Said feedback network 44 consists of a series connection of a resistor Rc and a capacitor Cc.

Moreover an input voltage signal Vin is supplied by means of a resistance Ra to the non inverting input of the error amplifier 20.

Therefore, the entirety of the operational amplifiers 18 and 20 and of the dipoles connected thereto, that is said network 45, constitutes a comparator designed to generate an error signal Verr.

Said signal Verr corresponds to the average value of the difference between the current supplied and the current desired. This network 45 has a low-pass transfer function mainly due to the pole introduced by the amplifier 20.

The output of the amplifier 20, that is the signal error Verr, is connected both with the PWM converter 16 and with the linear amplifier 17.

In other word, there are two driving circuits, one of which comprises a first generator of virtually square waves, that is the PWM converter 16, and the other one corresponds to the linear amplifier 17.

It is to be noted that the linear amplifier 17 can be a class AB linear amplifier.

The PWM converter 16 has its output coupled to the terminal C1, whilst the linear amplifier 17 has its output coupled to the terminal C2.

If to the two terminals C1 and C2 are sent two conduction control signals, one of which, that is the signal outputted by the PWM converter 16, consisting of a virtually square waves, and the other one, that is the signal outputted by the linear amplifier 17, consisting of an analogue signal, the transistors Mos2 and Mos3 constitute a first half-bridge circuit 23 of the bridge circuit 15, whereas the transistors Mos1 and Mos4 constitutes a second half-bridge circuit 24 of the bridge circuit 15.

By square wave is meant here merely a signal which can assume in a stable manner only two levels and is not necessarily periodic, as shown in the box 21, and by an analogue signal is meant a signal that changes instant by instant, as shown in the box 22.

Therefore, according to the present invention the two half bridge circuits 23 and 24 are simultaneously driven, respectively, one in a PWM modality, that is, by means of the PWM converter 16, and the other in a linear modality, that is, by means of the linear amplifier 17.

In this way the power dissipated by the bridge circuit 15 is equal to one half with respect to case of a fully linear driving.

It is to be noted also that the sensing resistance Rs is connected to the middle point of the half bridge circuit 24, that is OutP, so to perform the best detecting of the current Ivcm flowing in the load VCM.

In fact, in this way the detection of the current Ivcm is not perturbed by the fast common mode rejection as in the case of the bridge circuit 15 when is fully driven by PWM driver.

Moreover, due to the half bridge circuit 24 is linear driven, this permits to establish a connection line with the winding of the VCM (not shown in FIG. 3) with a low impedance.

In this way, said connection line can be used as a shield for the other output controlled by the half bridge circuit 23.

Figure 5:
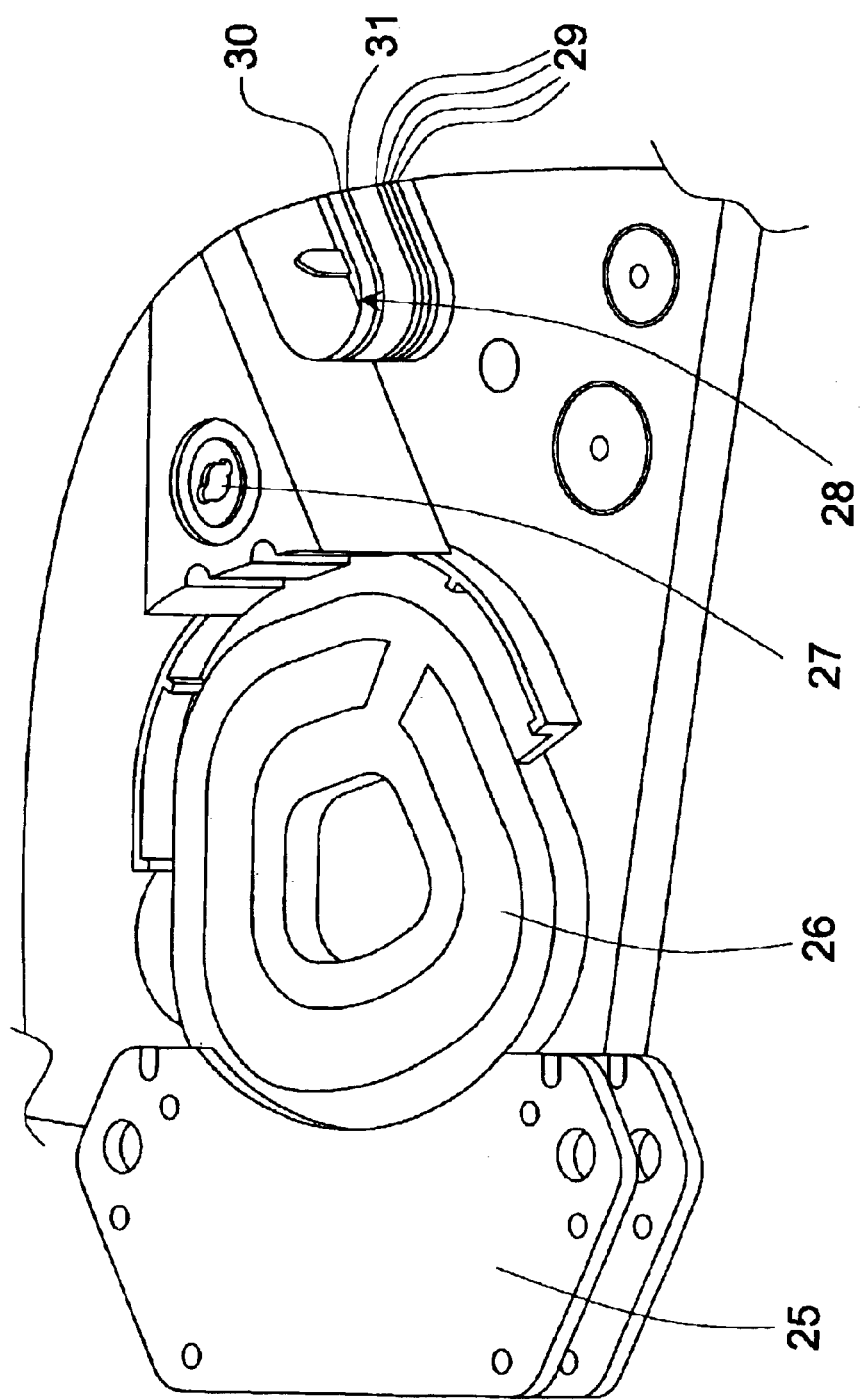
FIG. 5 shows a picture of an embodiment according to the present invention.

In fact, by referring now to the FIG. 5, wherein a picture of an embodiment according to the present invention is shown, it is possible to note a magnet assembly 25, a VCM 26, an actuator axis 27 and a flexible cable 28. This latter is used to connect both the VCM 26 and the reading and writing heads (not shown in FIG. 5).

What heretofore described is an assembly able to drive and control an hard disk (not shown in FIG. 5) of a computer.

Particularly, the flexible cable 28 has a plurality of read and write signals 29, an output PWM signal 30 and a output linear signal 31, whereas the output PWM signal 30 and the linear output signal 31 coming from the bridge circuit 15.

The specific displacement of the output PWM signal 30, the linear output signal 31 and of the read and write signals 29, realizes a shield that permits an increment both of the switching frequency of the PWM converter 16 and of the slew rate of the rising edge of the PWM signal.

In other word, this displacement of the signals 29, 30 and 31 permits to improve the capacitive uncoupling of those signals 29, 30 and 31.

Figure 4A:
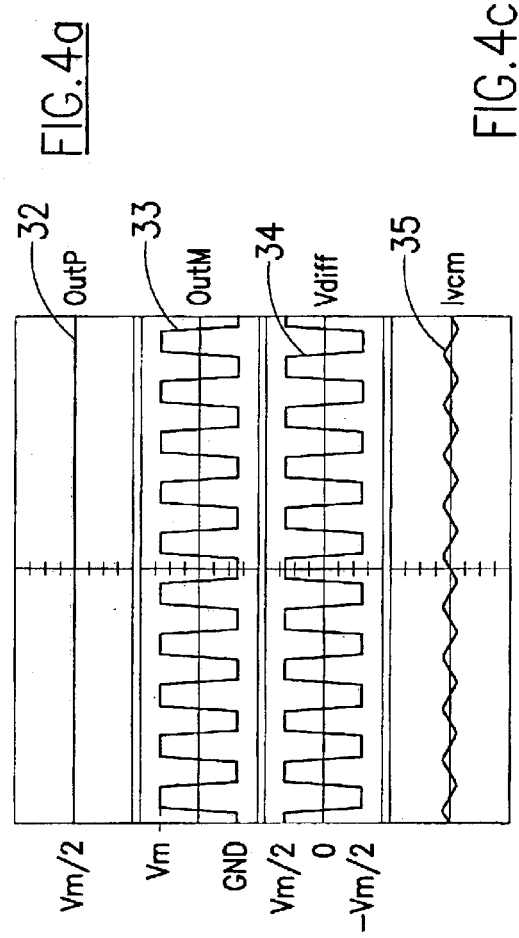
FIGS. 4a, 4b and 4c show a respective graphical measurement of the circuit of FIG. 3.
Figure 4C:
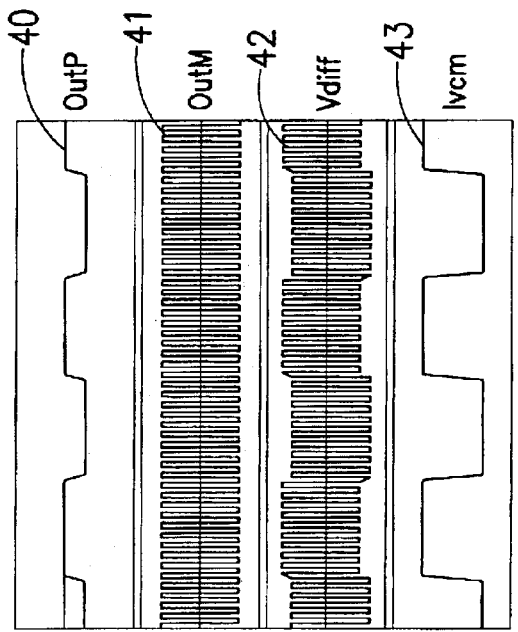
Figure 4B:
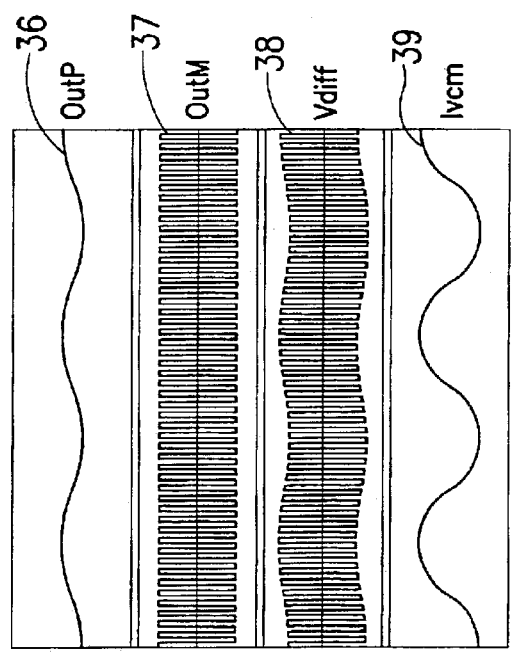

Referring now to the FIGS. 4a, 4b and 4c respective graphical simulations of the circuit of FIG. 3 are shown.

Particularly, in FIG. 4a there is an abscissa axis indicating the time expressed in μsec, an ordinate axis indicating a voltage and a first graph 32 indicating the voltage at the output OutP of the bridge circuit 15, a second graph 33 indicating the voltage at the output OutM of the bridge circuit 15, a third graph 34 indicating the voltage Vdiff at the load VCM as voltage difference between said voltage at the output OutP and said voltage at the output OutM, and a fourth graph 35 indicating the current Ivcm flowing in the load VCM.

In such a FIG. 4a said graphs relate to the null current driving in the load VCM; to the central point OutP a voltage Vm/2 is forced whereas to the central point OutM a square wave signal between a value Vm and GND is forced.

Said square wave signal has a duty cycle equal to 50%. To the load VCM there is the voltage Vdiff being deduced by the difference between said voltage at the output OutP, that is Vm/2, and said voltage at the output OutM, that is alternately Vm or GND. Said voltage Vdiff is a square wave voltage having value between +Vm/2 and −Vm/2, and having a value of duty cycle equal to 50%, and therefore having a null mean value.

Being the applied voltage with a null mean value also the current Icvm flowing in the load VCM will have a null mean value, with a superimposed ripple due to the resistance Rm and to the inductor Lm values of the load VCM and due to the switching frequency of the PWM converter 16.

The current Icvm is supplied to the load VCM by the transistors Mos1 and Mos3 when the voltage Vdiff is equal to +Vm/2, that is the voltage of the output OutP is equal to Vm/2 and the voltage of the output OutM is equal to GND, whereas said current Icvm is supplied to the load VCM by the transistors Mos2 and Mos4 when the voltage Vdiff is equal to −Vm/2, that is the voltage of the output OutP equal to Vm/2 and the voltage of the output OutM equal to Vm.

To drive the load VCM with a current having a positive direction, which is from OutP to OutM, a positive differential voltage has to be supplied.

For example, it is possible to fix the voltage of the output OutP to a value equal to Vm/2 and to decrease the duty cycle of the output OutM below the value of 50%.

Otherwise, by way of example, it is possible to fix the value of the duty cycle of the output OutP equal to 50% and to increase the voltage of the output OutM over the value Vm/2.

In both the cases the load VCM has a positive differential voltage Vdiff, causing an increment of the load current Ivcm, being said increment proportionally to the applied voltage value Vdiff.

The same considerations are also true for driving the load VCM with a negative current Icvm, that is a current having a direction from the output OutM to the output OutP, with the wisdom of change the polarity of the voltages.

Referring now to FIG. 4b, there is an abscissa axis indicating the time expressed in μsec, an ordinate axis indicating a voltage and a first graph 36 indicating the voltage at the output OutP of the bridge circuit 15, a second graph 37 indicating the voltage at the output OutM of the bridge circuit 15, a third graph 38 indicating the voltage Vdiff at the load VCM as voltage difference between said voltage at the output OutP and said voltage at the output OutM, and a fourth graph 39 indicating the current Ivcm flowing in the load VCM.

In such a FIG. 4b, said graphs relate to the sinusoidal wave form current driving, wherein the voltage of the graph 36 is driven around the voltage value Vm/2 with a sinusoidal shape. The voltage of the graph 37 is modulated around a duty cycle value equal to 50% having the same sinusoidal shape of the graph 36 but shifted of 180 degrees.

Referring now to FIG. 4c, there is an abscissa axis indicating the time expressed in μsec, an ordinate axis indicating a voltage and a first graph 40 indicating the voltage at the output OutP of the bridge circuit 15, a second graph 41 indicating the voltage at the output OutM of the bridge circuit 15, a third graph 42 indicating the voltage Vdiff at the load VCM as voltage difference between said voltage at the output OutP and said voltage at the output OutM, and a fourth graph 43 indicating the current Ivcm flowing in the load VCM.

In such a FIG. 4c said graphs relate to the square wave form current driving, wherein the voltage of the graph 40 is driven between two values one lower than Vm/2 and the other bigger than Vm/2.

The voltage of the graph 41 is modified between a duty cycle value lower than 50% and a value bigger than 50%.

In other word, referring to the FIGS. 4a, 4b and 4c in the case of low driving current, the central point OutP directly coupled with the linear amplifier 17 can be forced to a voltage equal to Vm/2, otherwise the duty cycle of the PWM converter can be modified in a differential way.

In the case of high current driving, the central point OutP can be forced to Vm, and therefore saturating completely the transistor Mos1, and controlling the current flowing in the PWM converter 16.

In the case of high current driving with negative polarity, the central point OutP can be fixed to ground, and therefore saturating completely the transistor Mos4.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups.

What is claimed is:

1. A bridge circuit comprising:
    a signal input, a signal output and at least two conduction control inputs for driving a voice coil motor in a linear mode and in a pulse width modulation (PWM) mode, the bridge circuit being driven by a PWM converter coupled to one of said two conduction control inputs and by a linear amplifier coupled to the other of said two conduction control inputs.

2. A bridge circuit according to claim 1, wherein said PWM converter and said linear amplifier are coupled to a control input for controlling the duty cycle of the generated wave of said PWM converter and for controlling the voltage value of said linear amplifier.

3. A bridge circuit according to claim 2, wherein the voltage on said control input is proportional to a current flowing through a detection means in series with said voice coil motor.

4. A bridge circuit according to the claim 3, wherein said detection means is coupled to the output of said linear amplifier.

5. A bridge circuit according to the claim 4, further comprising a feedback network having an input coupled to said signal output signal and having an output coupled to said control input.

6. A bridge circuit according to claim 5, further comprising:
    a sense amplifier having a first input coupled to the output of said detection means and a second input for receiving a reference signal; and
    an error amplifier having a first input coupled to the output of said sense amplifier, a second input for receiving said reference signal, a third input for receiving an input signal, and an output coupled to said control input.

7. A method for driving a bridge circuit comprising:
    providing a bridge circuit of the type having a signal input, a signal output, and at least two conduction control inputs;
    driving a voice coil motor with said bridge circuit in a linear mode and in a pulse width modulation mode; and
    simultaneously driving one of said two control inputs in the pulse width modulation mode and driving the other of said two control inputs in the linear mode.

8. The method of claim 7 further comprising driving one of said two control inputs with a square wave signal and the other of said two control inputs with an analog signal.

9. The method of claim 8 in which driving one of said two control inputs with a square wave signal comprises driving one of said two control inputs with a square wave signal having a variable duty cycle.

10. The method of claim 9 in which driving one of said two control inputs with a square wave signal having a variable duty cycle comprises driving one of said two control inputs with a square wave signal having a duty cycle that varies in the opposite direction to the duty cycle of said analog signal.

11. The method of claim 8 in which said square wave signal is modulated by the average current supplied by said bridge circuit to said signal output.

12. The method of claim 8 in which said square wave signal and said analog signal are generated by:
    detecting the current supplied at the signal output; and
    generating an error signal corresponding to the average value of the difference between the detected current and a reference signal corresponding to the average current value desired at the signal output.

* * * * *